US012699786B1

(12) United States Patent
Peterson et al.

(10) Patent No.: US 12,699,786 B1
(45) Date of Patent: *Aug. 4, 2026

(54) AUTHORIZATION METHODS AND SYSTEMS FOR ACCESSING MULTIPLE DATA SOURCES

(71) Applicant: Seeq Corporation, Seattle, WA (US)

(72) Inventors: Jon Peterson, Larkspur, CA (US); Dakota Kidd Kanner, Vancouver, WA (US); Marius Oancea, Şelimbăr (RO); James Bryan Zimmerman, White Salmon, WA (US)

(73) Assignee: Seeq Corporation, Seattle, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/583,673

(22) Filed: Feb. 21, 2024

Related U.S. Application Data

(63) Continuation of application No. 17/112,752, filed on Dec. 4, 2020, now Pat. No. 11,921,869.

(60) Provisional application No. 62/944,928, filed on Dec. 6, 2019, provisional application No. 62/944,709, filed on Dec. 6, 2019.

(51) Int. Cl.
| | |
|---|---|
| *G06F 21/00* | (2013.01) |
| *G06F 16/903* | (2019.01) |
| *G06F 21/44* | (2013.01) |
| *G06F 21/60* | (2013.01) |
| *G06F 21/62* | (2013.01) |

(52) U.S. Cl.
CPC ...... G06F 21/604 (2013.01); G06F 16/90344 (2019.01); G06F 21/44 (2013.01); G06F

*21/6218* (2013.01); *G06F 2221/2141* (2013.01); *G06F 2221/2145* (2013.01)

(58) Field of Classification Search
CPC .. G06F 16/90344; G06F 21/44; G06F 21/604; G06F 21/6218
See application file for complete search history.

(56) References Cited

U.S. PATENT DOCUMENTS

| | | | | |
|---|---|---|---|---|
| 8,655,757 | B1 * | 2/2014 | Wookey | ................. G06Q 30/06 705/35 |
| 2013/0054648 | A1 * | 2/2013 | Mehta | ..................... G06F 16/21 707/E17.005 |
| 2016/0255089 | A1 * | 9/2016 | Diestler | .............. G06F 21/6236 726/4 |

(Continued)

*Primary Examiner* — Rodman Alexander Mahmoudi
(74) *Attorney, Agent, or Firm* — Polsinelli PC; Derek Donahoe

(57) ABSTRACT

A data analytics system to authenticate and authorize access to multiple sources of data for access to the multiple data sources for one or more requesting devices. The system may duplicate and/or access rule sets included in the metadata of the corresponding data source and read identifiers of authorized users maintained by each of the multiple data sources. The access rule sets and authenticated identifiers may be synchronized or otherwise correlated to requesting device identifiers maintained by the data analytics system such that, as requests to access data obtained from one or more of the multiple data sources are received, the system may control access to or otherwise manage the requesting devices interactions with the data from the multiple data systems, reducing the authorization and authentication actions needed to be taken or executed by the requesting devices and the data sources.

20 Claims, 6 Drawing Sheets

(56) References Cited

U.S. PATENT DOCUMENTS

2018/0024701 A1* 1/2018 Sanches ................ G06F 16/172
715/781
2021/0012023 A1* 1/2021 Dowlatkhah ......... H04L 63/105

* cited by examiner

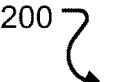
200
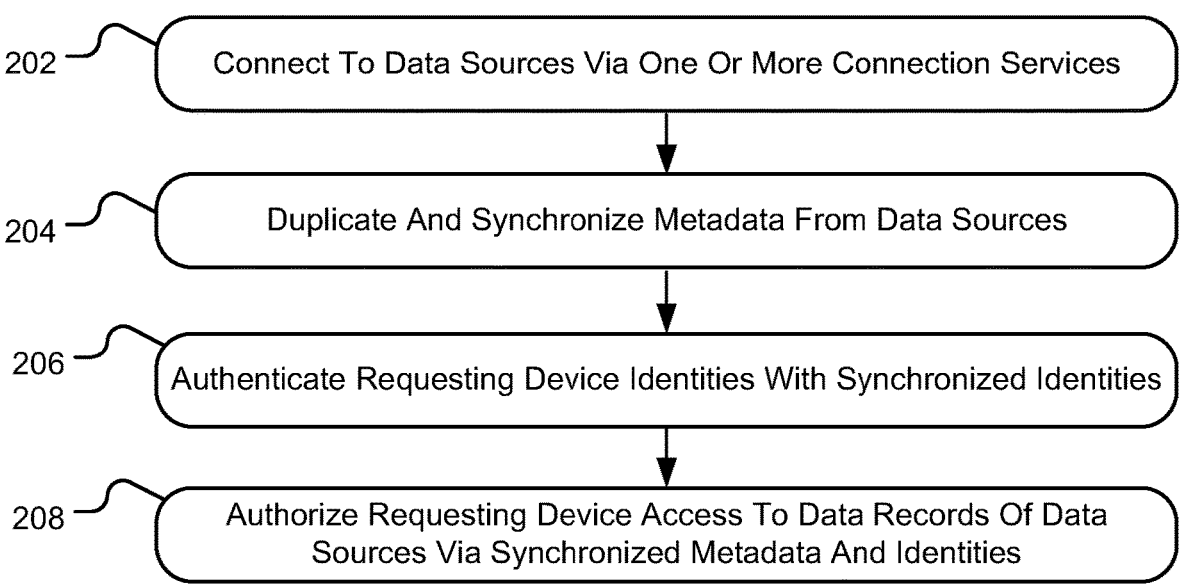
202 — Connect To Data Sources Via One Or More Connection Services
204 — Duplicate And Synchronize Metadata From Data Sources
206 — Authenticate Requesting Device Identities With Synchronized Identities
208 — Authorize Requesting Device Access To Data Records Of Data Sources Via Synchronized Metadata And Identities
FIG. 2

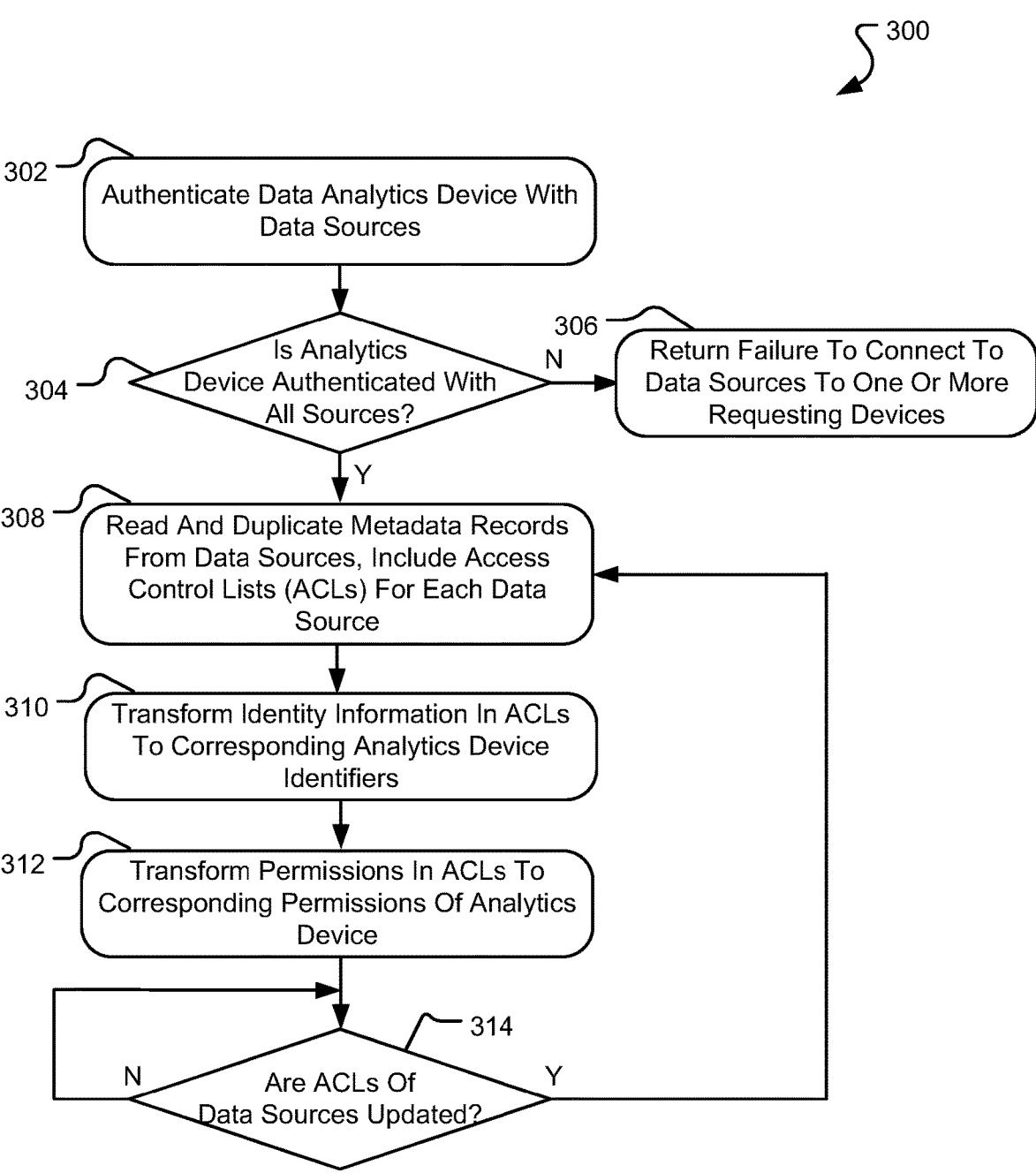

300

302 — Authenticate Data Analytics Device With Data Sources

304 — Is Analytics Device Authenticated With All Sources?

N

306 — Return Failure To Connect To Data Sources To One Or More Requesting Devices

Y

308 — Read And Duplicate Metadata Records From Data Sources, Include Access Control Lists (ACLs) For Each Data Source 310 — Transform Identity Information In ACLs To Corresponding Analytics Device Identifiers 312 — Transform Permissions In ACLs To Corresponding Permissions Of Analytics Device

314

N          Are ACLs Of Data Sources Updated?          Y

FIG.3

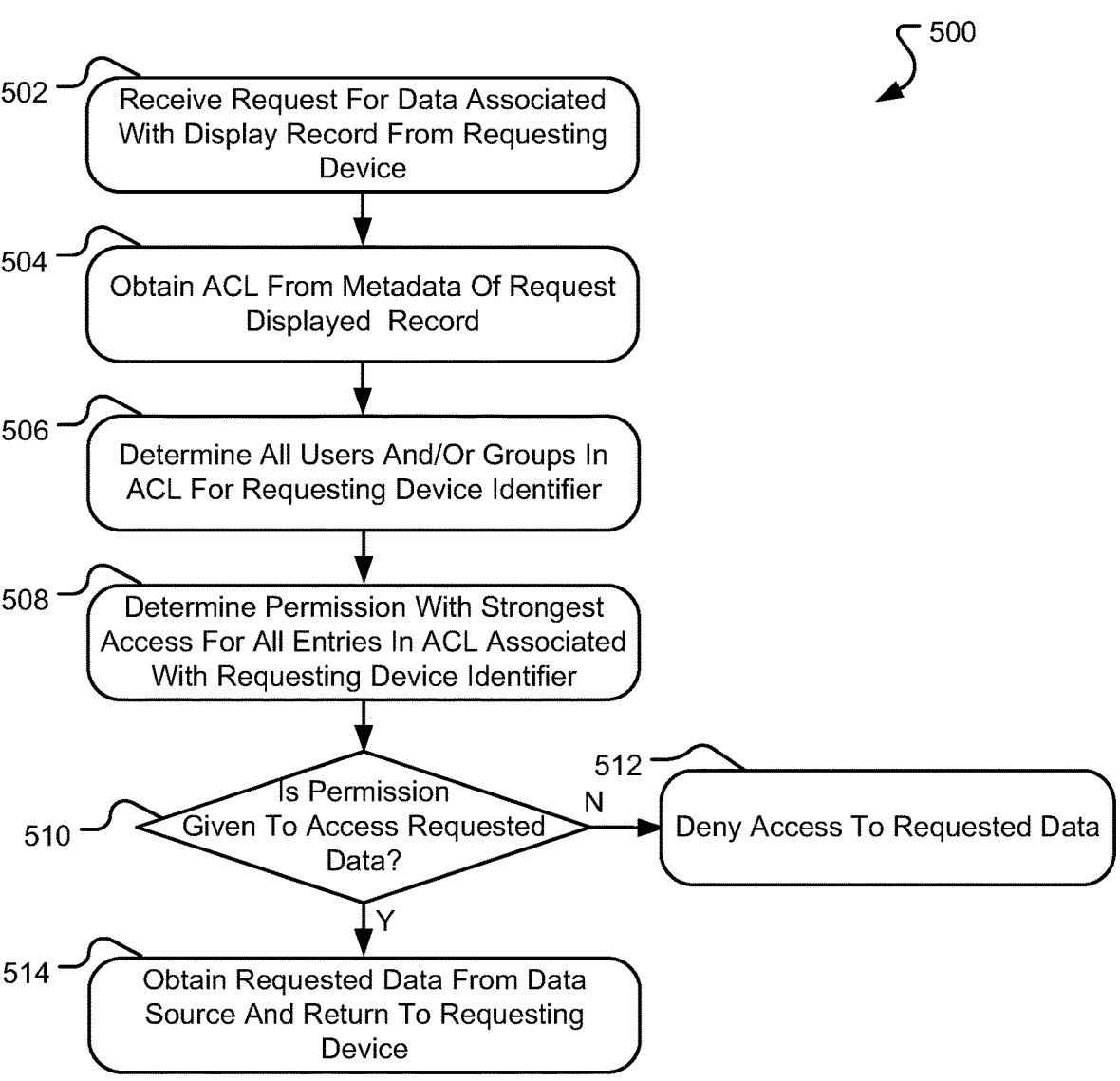

500

502  Receive Request For Data Associated With Display Record From Requesting Device 504  Obtain ACL From Metadata Of Request Displayed Record 506  Determine All Users And/Or Groups In ACL For Requesting Device Identifier 508  Determine Permission With Strongest Access For All Entries In ACL Associated With Requesting Device Identifier 510  Is Permission Given To Access Requested Data?

512  N  Deny Access To Requested Data

Y

514  Obtain Requested Data From Data Source And Return To Requesting Device

FIG.5

AUTHORIZATION METHODS AND SYSTEMS FOR ACCESSING MULTIPLE DATA SOURCES

RELATED APPLICATIONS

This application is a continuation of and is related to U.S. patent application Ser. No. 17/112,752 filed Dec. 4, 2020, titled "AUTHORIZATION METHODS AND SYSTEM FOR ACCESSING MULTIPLE DATA SOURCES," which claims priority under 35 U.S.C. § 119 (e) from U.S. Patent Application No. 62/944,709 filed Dec. 6, 2019, titled "AUTHORIZATION METHODS AND SYSTEM FOR ACCESSING MULTIPLE DATA SOURCES," and from U.S. Patent Application No. 62/944,928 filed Dec. 6, 2019 titled "AUTHORIZATION METHODS AND SYSTEM FOR ACCESSING MULTIPLE DATA SOURCES," all of which are hereby incorporated by reference in their entirety.

TECHNICAL FIELD

Embodiments of the present disclosure generally relate to systems and methods for managing a data analytics system, and more specifically to a system and method for authentication and authorization of requesting devices to access data available from multiple data sources via a data analytics system.

BACKGROUND

A manufacturing system, a chemical processing plant, a car, airplane, train or other transportation system, a computer network, a stock exchange, a building HVAC system, or even a human in a hospital are increasingly likely to have sensors or measurements which continuously monitor and collect data associated with aspects of the respective system. In some instances, this measurement data stored for analysis, either immediately or in the future, where each reading is recorded along with a timestamp (and possibly other metadata). In other instances, the measurement data may be streamed in real-time to an analysis system. The measurement data is often referred to as time-series data, but other terms exist as well, and the data store may be called a data historian, but again, multiple terms are used.

Sensor measurement and analysis can serve many purposes; condition monitoring, safety, reliability, optimization, supply chain automation, modeling, change detection, or predict equipment failure, to name a few. The sensors or readings are often insufficient by themselves, individually or in aggregate, to obtain accurate conclusions about a system state. In some cases, the time-series data may be combined with other data or information to improve the analysis, referred to as contextualization. Contextualizing data sources may include other data-gathering, such as weather data, maintenance data, control information, or human input. Human input can be in the form of additional data, equations, rules, or observations.

To aid in the understanding of such time-series data, data analytic systems and methods have been developed that provide access and processing of data from multiple data sources in an effort to contextualize and make sense of the vast amount of obtained measurements and information. However, many data sources that provide time-series data to an analytic system often maintain authentication and authorization procedures on behalf of requesting devices for accessing individual data sources, generating a complex system of multiple and unique authentications and authorizations to access the data from multiple sources. For example, some data analytic systems pass the authentication and authorization process for accessing a data source onto a requesting device, burdening the requesting device with maintaining the managing of each unique access to the data sources while the analytic system acts as an intermediary between the requesting device and the data sources. In another example, the data analytic system may authenticate the analytic system itself with each data source to relieve the burden on the requesting devices. However, this approach may open the data sources to access by multiple requesting devices or users, including requesting devices not granted access to the stored data and creating security vulnerabilities in accessing the data sources.

It is with these observations in mind, among others, that aspects of the present disclosure were conceived.

SUMMARY

One implementation of the present disclosure may take the form of method for operating a data analytics system. The method may include the operations of obtaining, from a plurality of data sources, a plurality of access rule sets each comprising an entity identifier and a corresponding access permission to access a data record available from a corresponding data source and generating a synchronized access rule set comprising a plurality of synchronized identifiers each corresponding to one of the entity identifiers and a plurality of synchronized permission rules corresponding to one of the access permissions. The method may also include the operation of transmitting, based on a synchronized permission rule corresponding to a synchronized identifier included in the synchronized access rule set, the data record to the requesting device, wherein the requesting device is associated with the synchronized identifier.

Another implementation of the present disclosure may take the form of a data management device. The device may include a processor in communication with a tangible storage medium storing instructions that are executed by the processor to perform certain operations. Such operations may include connecting to a plurality of data sources over a network, reading, from each of the plurality of data sources, an access control list each comprising an access identifier and a corresponding access permission to a data record available from a corresponding data source of the plurality of data sources and generating a synchronized access control list. The synchronized access control list may include a plurality of synchronized identifiers mapped to a plurality of access identifiers of the access control list and a plurality of synchronized permission rules corresponding to the access permissions to the data record. Further, the operations may include retrieving, in response to a request to access the data record from a requesting device and based on a synchronized permission rule corresponding to a synchronized identifier associated with the requesting device, the data record from the corresponding data source.

BRIEF DESCRIPTION OF THE DRAWINGS

FIG. 2 is a flowchart of a method for authentication and authorization of requesting devices to multiple data sources in accordance with one embodiment.

FIG. 3 is a flowchart of a method for synchronizing authorization metadata and user identities from multiple data sources in accordance with one embodiment.

FIG. 5 is a flowchart of a method for granting authorization to access one or more data sets from multiple data sources in accordance with one embodiment.

DETAILED DESCRIPTION

Figure 1:
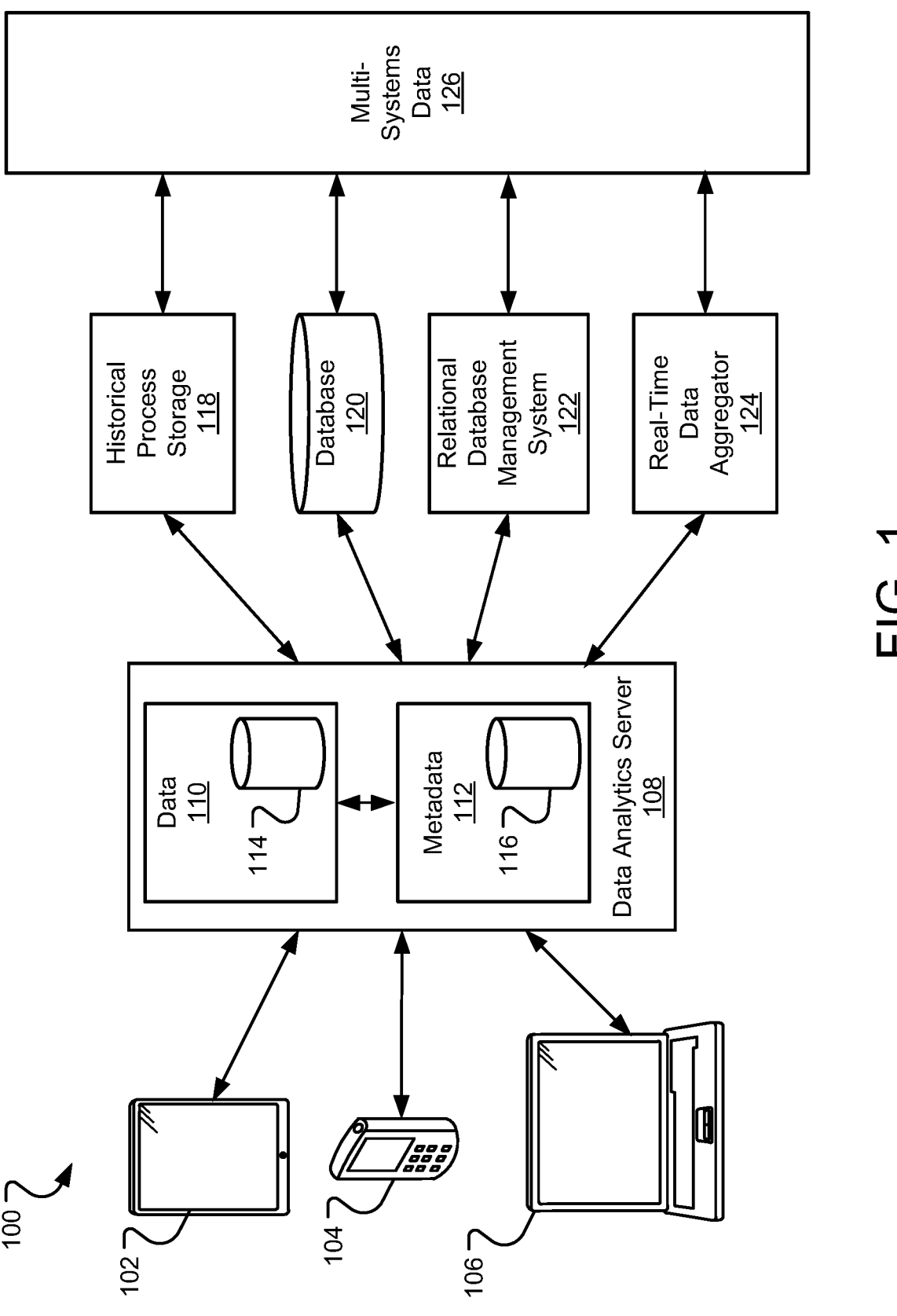
FIG. 1 is a schematic diagram illustrating a network operating environment for providing access to multiple data sources.

Aspects of the present disclosure involve systems, methods, and the like, for providing authentication and authorization to multiple sources of data via a data analytics system that maintains the access permissions of the individual data sources. In particular, a data analytics system may provide access to multiple data sources for one or more requesting devices, including authorizing and authenticating each of the requesting devices with the individual data sources. The data analytics system may remove the need for each requesting device to gain access to the data sources individually. In one particular implementation, the data analytics system may duplicate and/or read metadata from the multiple data sources, including access rule sets included in or otherwise associated with the metadata of the corresponding data source. The data analytics system may also duplicate and/or read identifiers of authorized users maintained by each of the multiple data sources. The access rule sets and authenticated identifiers may be synchronized or otherwise correlated to requesting device identifiers maintained by the data analytics system such that, as requests to access data obtained from one or more of the multiple data sources is received from a requesting device, the data analytics system may determine permissions given to the requesting device by one or more of the multiple data sources as indicated by the access rule sets. The data analytics system may then control access to or otherwise manage the requesting device interactions with the data from the multiple data systems, reducing the authorization and authentication actions needed to be taken or executed by the requesting devices and the data sources.

By processing authentication and authorization procedures for the multiple data sources connected to the data analytics system, security of the data provided by the sources may be maintained without incurring a processing cost incurred by the requesting devices or the data analytics system as would be the case with a conventional pass-through authentication method. In addition, by maintaining the access rule sets at a centralized system or service provided by the data analytics system, a system-wide access rule set may be generated. For example, the access rule sets obtained from the multiple data sources may be altered or combined to reduce the rule set sizes, thereby improving the processing of the authentication and authorization of the requesting devices via the access rule sets. In other examples, machine learning techniques may be applied to combine and/or reduce the access rule set for a particular data source, access rule sets from multiple data sources may be combined where similar, rule sets may be normalized to a common form, or any other manipulation of the access rule sets of the data sources may occur while maintaining the intent or aim of the rule sets of each of the data sources.

Through the generation or alteration of access rules based on the obtained access rule sets from the data sources, one or more access rules may be generated, combined, modified, etc. by the data analytics system to provide the user or device with access to the aggregated data where previous systems may deny such access. For example, application of each access rule set associated with the data sources to a particular request for data may be overly restrictive, such as in the instance that a user or device has access to an aggregate of data from the data source without direct access to one or more of particular data source. In this instance, an access rule may be generated for the requesting device by the analytics system to provide access to the aggregated data, while maintaining the restriction on access to a particular data source. Similarly, some previous data analytics systems may be overly lenient and provide access to data sources that users or devices are not granted access by the data source. In response, the data analytics system described herein may maintain data permissions as indicated in the access rule sets, while reducing communications between the various devices of the system. Thus, the duplication and modification of the access rule sets of one or more of the data sources therefore provide additional flexibility in controlling the access to the data of the data sources connected to the data system.

FIG. 1 is a schematic diagram illustrating a network operating environment 100 for providing access to multiple data sources 118-124 via a data analytics server 108 or system. In general, a data analytics server 108 or other data analytics device or devices may connect to multiple data sources 118-124 to obtain data from such sources and/or provide access or analysis of the data to one or more requesting devices 102-106. In some instances, the data analytics server 108 may provide contextualization of time-series data for analysis and processing by the requesting devices 102-106 by combining the data from the multiple sources into an easy to read or understand format. In one instance, the data analytics server 108 may display, on a corresponding requesting device 102-106, requested data sets, combination of data sets, graphs of data sets, and the like retrieved from the data sources 118-124. As such, the data analytics server 108 provides a system through which time-series data may be accessed and processed from the multiple data sources 1128-124 for consumption by users of the requesting devices 102-106.

The requesting devices 102-106 may be any type of computing device, such as tablet devices 102, smartphones 104, laptops 106, desktop computers, or any other type of computing device configured to communicate with data analytics server 108 over a network connection. In some instances, the requesting devices 102-106 may include a display device incorporated in or connected to the requesting device for display of data retrieved and processed by the data analytics system 108. Further, each requesting device 102-106 may include a browser or other application executed by the respective device to access and communicate with the data analytics server 108. As mentioned, the requesting devices 102-106 may contact and communicate with the data analytics server 108 over a network connection. In one example, the browser program executed by the requesting device 102-106 may utilize a Uniform Resource Locator (URL), Internet Protocol (IP) address, or other network address or identifier to connect to the data analytics server 108 and become a client device of the server 108. Additional communication between the server 108 and the requesting devices 102-106 is discussed in more detail below.

The data analytics server 108 may also connect to one or more data sources 118-124 to obtain or otherwise receive data or information from the sources, such as time-series data obtained from one or more monitored systems. The multiple data sources 118-124 may include any type of data acquisition, data storage, and/or data processing system or device, such as but not limited to, a time-series historical process storage 118, one or more databases 120, a relational database management system 122, a real-time data aggregator 124, and the like. Each data source 118-124 may receive time-series data from any number of data producing devices or systems, illustrated in FIG. 1 as multi-systems data 126. In general, the data sources 118-124 may store the received data and/or process the received data 126 as received from a monitored device, system, network of devices or systems, and the like. The data sources 118-124 typically provide the stored and/or processed data to requesting devices for analysis and retrieval via data analytics server 108. As should be appreciated, any number and type of devices or systems that store or otherwise make available data 126, such as time-series data, from one or more systems may connect to the data analytics server 108.

In many instances, the data sources 118-124 may include different operating systems, communication schemes, manufacturers, and the like such that direct communication with each data source may be complicated. Thus, in one instance, a data analytics server 108 may provide an interface through which the requesting devices 102-106 may access the data available from the data sources 118-124 by translating requests for such data to the various connected data sources 118-124, among other features. For example, data analytics server 108 may execute one or more applications and/or Application Programming Interfaces (APIs) for translating requests or other communications from the requesting devices 102-106 to a format used by the respective data source 118-124 for communications. In this manner, the data analytics server 108 may receive instructions, commands, communications, packets, etc. from the requesting devices 102-106 and, via the applications executed by the server 108, communicate with an indicated data source 118-124 to execute the received instruction. The data analytics server 108 may also alter, modify, store, translate, etc. communications and/or data received from the data sources 118-124 for transmission to an indicated requesting device 102-106. For example, the data analytics server 108 may correlate and combine data from multiple data sources 118-124 into a single display for a user of a requesting device to view on a display screen. In general, the data analytics server 108 may be an interface through which requesting devices 102-106 may access the data available from the data sources 118-124 and process the data for ease of understanding and consumption by the requesting device 102-106.

In some instances, the data analytics server 108 may request and receive data 110 from the data sources 118-124 for processing and providing to the requesting devices 102-106. Such data 110 may be stored in one or more data storage components 114 of the server 108 after being received from the respective data sources 118-124. The data analytics server 108 may also request and receive metadata 112 associated with such data from the data sources 118-124 and store, in one or more data storage components 116 of the server 108, the metadata. As explained in more detail below, aspects of the metadata 112 may be utilized by the data analytics server 108 to identify data sets and/or data sources 118-124 being requested by a requesting device 102-106 for use in authenticating the requesting device and/or authorizing access to the data by the requesting device. As such, the metadata 112 may be searchable as stored by the data analytics server 108 in response to a search string received from a requesting device 102-106 for a particular data set. Additional operations of the data analytics server 108 to authenticate and authorize a requesting device 102-106 are discussed in more detail below.

As each data source 118-124 may include a different operating system as discussed above, the process of authenticating a user or requesting device 102-106 and providing authorization to access the data of the data sources 118-124 may vary from source to source. For example, database 120 may include a first operating system or procedure for authenticating and authorizing access to the stored data while the relational database management system 122 may include a different operating system or procedure for authenticating and authorizing access to stored data. In some instances, the data analytics system 108 may act as a middle-man between the requesting devices 102-16 and the data sources 118-124 and provide the proper authentication information to each data source to access the corresponding stored data, such as a username/password combination or other type of authenticating information. In one particular example, the data analytics server 108 may provide authentication information associated with the data analytics server itself. For example, the data analytics server 108 may register a username and/or password with each data source 118-124 to gain access to the respective data sources. As each data source 118-124 may manage access protocols and methods for their respective stored data, the data analytics server 108 may need to register with each data source individually to gain access to the data. Further, each data source 118-124 may provide varying levels of access to the data analytics system 108, although typically such access would allow the server to download or otherwise obtain the stored data.

Providing the data analytics server 108 with access to obtain the stored data at each data source 118-124 may allow the server to store the data in data storage 110. However, once the data is stored at the data analytics server 108, access to the data may be granted for the requesting devices 102-106 by some data analytics servers, even those requesting devices without permission to access particular data sources from which the data is obtained. To address this security vulnerability, the data analytics server 108 may instruct the requesting devices 102-106 to provide authenticating information for each request for data from one or more of the data sources 118-124 and pass the authenticating information onto the data sources 118-124 for authentication and authorization at the data source. In other words, the data analytics server 108 may recheck authentication and/or authorization for each request for data received from the requesting devices 102-106. However, this process may be cumbersome and may consume large processing power for both the server 108 (which may support thousands of users or requesting devices) and at the data sources 118-124 themselves.

To address the inefficiencies and/or security vulnerabilities of providing access to data at a data analytics server 108, FIG. 2 illustrates a flowchart of a method 200 for authentication and authorization of requesting devices 102-106 to multiple data sources 118-124 in accordance with one embodiment of the present disclosure. In some instances, the operations of the method 200 may be executed or performed by the data analytics server 108 of FIG. 1. In other instances, the operations of the method 200 may be performed by any networking or computing device of a data analytics system, including requesting devices 102-106 and/or data sources 118-124. Further, the operations of the method 200 may be performed through hardware components of the computing device, software programs executed by the computing device, or a combination of both hardware and software components.

Beginning in operation 202, the server 108 may connect to one or more data sources 118-124 explained above. In one instance, the server 108 may execute a service program to connect to data source 118-124 to exchange identifiers and/or other credential information to establish the server 108 as a client of the target data sources 118-124. For example, the server 108 may include a process to register a server identifier (such as a username) with the data source 118-124 via a registration process managed by the data source 118-124. In some instances, the server 108 may provide a universal identifier common to the server 108 that is used to register or authenticate the server with multiple data sources 118-124 connected or in communication with the server 108. The registration information provided by the server 108 may include a username identifier, a password, a service account identifier, and/or any other unique identifier. The corresponding data source 118-124 may, in response, verify or otherwise compare the received information with authentication information maintained by the data source. In instances in which the server 108 accesses the data source 118-124 for the first time, the data source may store the registration information for use in future access requests by the server. Upon registration of the data analytics server 108, the data source 118-124 may provide access to the data of the data source 118-124 to the server 108. In some instances, a rule set of access permissions may be associated with the server 108 at the data source 118-124 that determined a level of access to the stored data. Generally, the data analytics server 108 is provided access to obtain the data from the data source 118-124. As each data source 118-124 may execute a different operating system for managing access, the server 108 may be configured to provide particular registration information in a particular format to the data sources 118-124 in accordance with the operating system of the data source. For example, the server 108 may be associated with a different username or other identifier for each data source 118-124 to which the server is registered.

Upon connection to the data sources 118-124, the server 108 may request or otherwise obtain authorization metadata information from one or more of the connected data sources 118-124 in operation 204 and duplicate or synchronize metadata from the one or more connected data sources. One example for synchronizing authorization metadata and user identities from multiple data sources is illustrated in the flowchart of method 300 of FIG. 3. Similar to above, the operations of the method 300 of FIG. 3 may be executed or performed by the server 108 to perform operation 204, although other devices of the system 100 of FIG. 1 may also perform the operations. Beginning in operation 302, the server 108 provides a identifier of the server to authenticate with the data sources 118-124, as described above. For example, the server 108 may provide, upon registration with the data sources 118-124, authentication information (such as a username, password, and/or service identifier) to the data sources. In operation 304, the server 108 may determine if authentication by the data sources 118-124 is received. The authentication process may include receiving a verification of a successful authentication with the data sources 118-124 and/or the exchange of information packets between the connected devices. The communications between the devices may be managed by the services of the server 108, such as through one or more APIs as described above. If the server 108 is not authenticated by the data sources 118-124, the server 108 may return a failure to connect notification to one or more of the requesting devices 102-106 in operation 306 and/or retry authentication with the one or more data sources 118-124.

Assuming the server 108 successfully authenticates with the data sources 118-124, the server 108 may, in operation 308, read or obtain metadata records 112 from the connected data sources 118-124. In some instances, the metadata records obtained from the data sources 118-124 may be duplicated and stored at the analytics server 108 for use in authenticating and authorizing requests for data from the requesting devices 102-106. For example, each data source 118-124 may maintain metadata corresponding to the data obtained and stored at the source from the multi-system data 126, such as a description of the stored data, units of measurements associated with the data, data collection information (such as locations/types of sensors, registers to read), and the like. In some particular instances, the metadata may also include information corresponding to accessing and interacting with the respective data sources, such as authorization information, authentication information, access rules and permissions, and the like. The metadata 112 may be obtained via one or more calls to the data sources 118-124 requesting the metadata and, in some instances, via an API for communicating with the corresponding data source 118-124. Upon receipt, the data analytics server 108 may store the obtained metadata at the server 108. The metadata 112 may be stored such that the server 108 may quickly search through the metadata to obtain portions of the obtained metadata. In other words, the metadata 112 may provide a searchable list of available data about the data sources 118-124 and/or the data obtained from the data sources. Such metadata 112 may be provided to the server 108 in one or more metadata records or other types of data files. Further, the server 108 may duplicate or otherwise store the metadata 112 in database 116 for use during searches received from the requesting devices 102-106.

Included in the metadata 112 received from the data sources 118-124 may be one or more access rule sets. In general, an access rule set is a collection of identifiers and corresponding access permissions associated with the data source from which the access rule set is received that indicate some level of access to the data maintained by the data source. For example, a first access rule set received from the database 120 may include identifiers of entities registered with the database and corresponding permissions to accessing the data stored at the database, such as read permission, write permission, delete permission, and the like. A second access rule set may be obtained from relational database management system 122 that includes a second set of identifiers and access permissions associated with the relational database management system. Access rule sets may be in any format, including lists, tables, spreadsheets, graphs, and the like that provide an indication of permission to access or view the data of the data sources corresponding to entities registered with the data source. In general, the access rule sets for any data source 118-124 may be provided in any known or hereafter developed manner for transferring access rule or permission information to a device requesting such metadata, such as data analytics server 108. In one particular example, the access rule set may take the form of an access control list (ACL). Although used throughout this disclosure, the ACL is but one example of an access rule set for a data source 118-124 and other forms of the rule set may be utilized. In one example, a relational database management system (RDBMS) 122 may provide an ACL that includes each approved or registered username or other system identifier recognized by the data source 122 as having some access to the system 122. The ACL may also associate, with each identifier, a type of permission to access the system 122. Permissions may include many types of access levels, such as access to all data, access to subsets of data, access to view but not alter the data, access to alter the data, and the like. In general, each permission of the ACL provides a description of combination of instructions that control the level of access provided to or associated with the list of identifiers within the ACL for the data source 118-124. The information of the ACL (or the ACL itself) may be included in the metadata 112 obtained from the data sources 118-124 and duplicated or stored at the server 108.

In addition to obtaining the ACL from each data source 118-124, the server 108 may also transform identity information in each metadata record ACL in operation 310. Transformation of the identity information from the ACL may include associating each identity in one or more ACL records to a functionally equivalent requesting device identifier generated by the server 108. In particular, many data sources 118-124 include an identity system that associates identities of registered entities managed by the data source with identities in an enterprise identity management system (EIMS). In some instances, an EIMS identity is associated with a user (associated with a single person, a group, an enterprise, a company, a system, etc.) or an identifier of a single requesting device. In other instances, the EIMS identity may be associated with a group of users utilizing the same or a similar identifier. A group of the EIMS may include any number of individual users of the data source or may include any number of other groups. A data source identity may reference one or more EIMS identities. The metadata record ACL of a data source 118-124 may therefore maintain a list of data source identities (for users provided access to the data source) and associations of those data source identities to corresponding EIMS identities.

Identity duplication and synchronization at the server 108 of the metadata record ACL may include duplicating (and storing) each data source identity and generating a unique requesting device 102-106 identity that maps to the EIMS identities. For example, the server 108 may assign or otherwise associate a unique identifier to a requesting device 102-106 requesting to connect to a data source 118-124. The server 108 may also associate the unique identifier with the EIMS identifier included in the received metadata record ACL by mapping the unique identifier to one or more identifiers obtained from the ACLs. In some instances, this duplication and synchronization process generates a map between the requesting device identities and the EIMS identities that cannot be modified by other processes within the server 108 or by a user of the server to maintain the relationship between the identities of the requesting devices 102-106 and the identities included in the ACLs received from the data sources 118-124.

In operation 312, the permissions associated with the EIMS identities and included in the metadata record ACL may also be transformed. In particular, each permission included in the ACLs may be transformed into a functionally equivalent permission for use by the server 108. As mentioned above, each data source 118-124 may include an operating system that is different than the server 108 and/or the other data sources. Thus, the permissions included in the metadata record ACL may be in a particular format corresponding to the operating system from which the metadata record was received. The transformation of the permissions, therefore, may include translating the permissions into a functionally equivalent instruction in a format utilized by the server 108 for granting or providing access to one or more data sets. Some data permissions may also be assumed or assigned by the server 108 to a requesting device 102-106. For example, a permission label for real-time data aggregator 124 source may provide a device with "read" permissions, "write" permissions, and "delete" permissions. The server 108, on the other hand, may not include a "delete" permission but may instead provide a "manage data" permission in which devices with the manage data permission may delete data, along with other permissions or interactions. Thus, the server 108 in this example may translate the permissions provided by the data aggregator 124 from read/write/delete to read/write/manage. In general, the translations applied to permissions included in the received ACLs may be functionally equivalent to the permissions granted by the data sources 118-124 such that the intended security of the stored data is maintained in the metadata 112 stored at the server 108.

The transformed permissions may be stored along with the transformed identities to generate a functionally identical ACL at the server 108 corresponding to the metadata record ACL received from the data source 118-124. Further, the above operations may occur for each data source 118-124 in communication with the server 108 to generate a duplication of the metadata record ACLs from each data source. Also, the server 108 may determine, in operation 314, if any of the metadata of the data sources 118-124 is updated and, if yes, return to operation 308 to reduplicate and transform the updated metadata 112 information of the data sources 118-124. In this manner, the server 108 may create a transformed ACL for each data source 118-124 that is functionally equivalent to the updated ACL metadata information of the data sources.

Transformation of the identity information and/or the permissions may also include modification of the contents of the ACLs. For example, transformation of the ACLs may include combining ACLs from multiple metadata records and/or multiple data sources where duplications or commonalities are present to reduce the size of the ACL maintained by the server 108. In another example, the server 108 may generate an alternate ACL corresponding to an intersection of multiple ACLs received from the data sources. Through the transformation process, the server 108 may generate new ACLs or modify information included in received ACLs to further control the authentication and authorization of requesting devices to the data of the data sources. In many instances, such modification may extend the intent or functionality of the receive ACLs from the data sources to maintain the security of the data sources 118-124 while providing additional flexibility in the structure and information of the synchronized ACLs.

Returning to method 200, the server 108 may use the transformed ACLs to authenticate requesting device identifiers with the server identifiers stored in the transformed ACL tables in operation 206. For example, the requesting device 102-106 may transmit or otherwise provide an identifier associated with the requesting device. In some instance, the requesting device 102-106 may receive a unique identifier from the server 108 when the requesting device 102-106 registers with the server 108 to receive one or more services from the server 108. The requesting device 102-106 may provide this unique identifier when requesting the access of data, as described below. Further, because the association of the unique identifier to the EIMS identity of the metadata record ACL is maintained by the server 108, the unique identity may be used by the server 108 as the EIMS identity for the requesting device 102-106.

Figure 4:
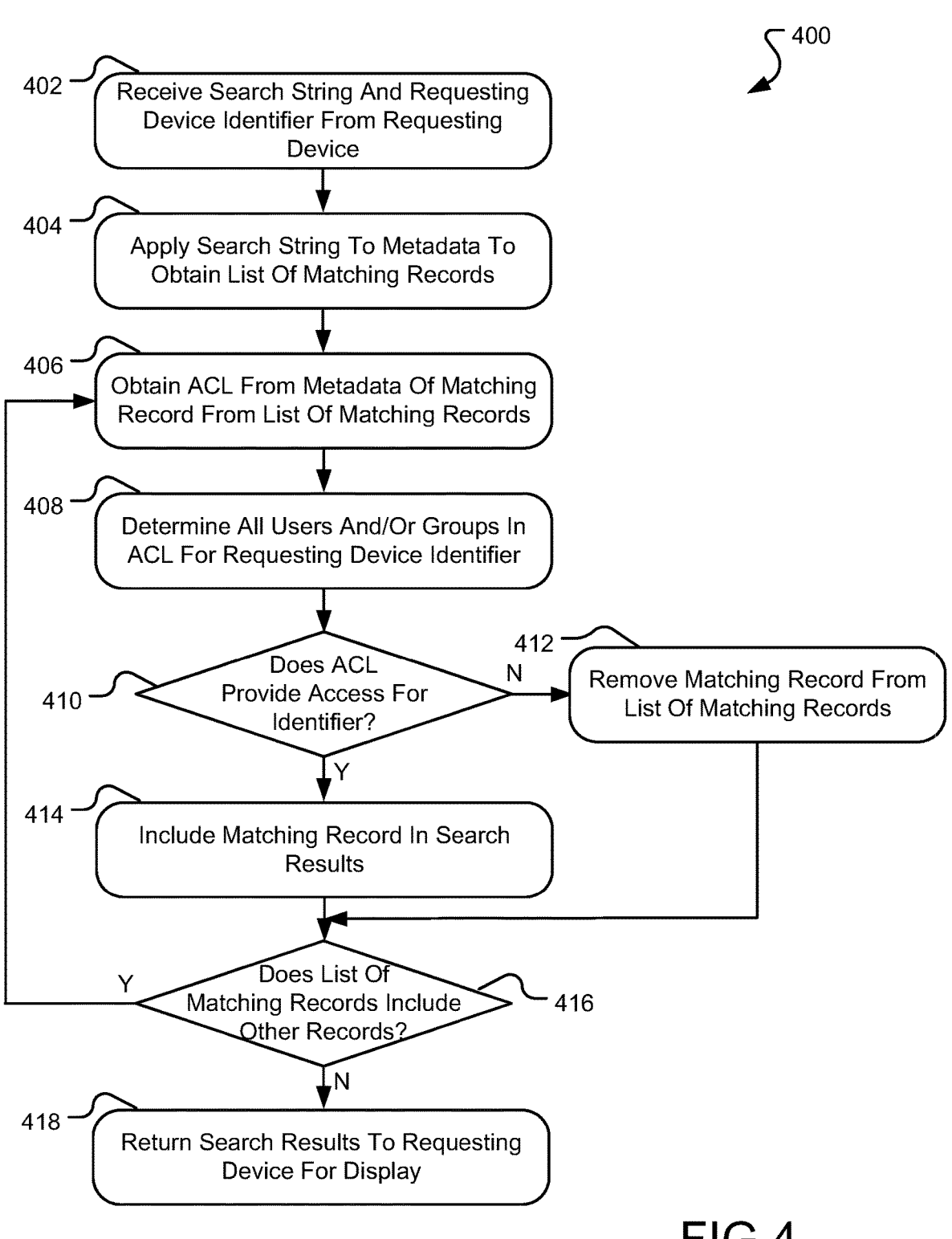
FIG. 4 is a flowchart of a method for providing search results of available data sets from multiple data sources based on authorization to access the data sets in accordance with one embodiment.

In operation 208, the server 108 may authorize a requesting device access to data records of the data sources 118-124 via the synchronized metadata ACL records. In particular, FIG. 4 is a flowchart of a method 400 for providing search results of available data sets from multiple data sources 118-124 based on an authorization to access the data sets in accordance with one embodiment. The operations of the method 400 of FIG. 4 may be performed by the server 108 in response to receiving a request for data from a requesting device 102-106. For example, requesting device 106 may provide, in operation 402, a request for data from a connected data source 118-124. The request may include a search string corresponding to a subset of the system data 126 available from at least one data source 118-124. The request may also include a requesting device identifier, such as the unique identifier provided to the requesting device by the server 108 upon registration with the server. Other information may also be transmitted from the requesting device 106 to the server 108. Further, in some instances, the request may be provided via the browser program executed on the requesting device 106.

In operation 404, the server 108 may apply the search string to the metadata 112 stored at the server 108 to identify any matching data records included in the search string. For example, the search string may include an identification a particular component of a monitored system by including a name or other identifier of the particular component to request data corresponding to that identified component. Other subsets of the data 126 may also be identified in the search string. The server 108, in response to the information included in the search string, may search the metadata records 112 received from the data sources 118-124 to determine data sets that correspond to the search string. As explained above, the metadata 112 may include information and/or identification of the kinds of data 110 obtained from the data sources 118-124 and stored or cached at the server. The server 108 may also determine which particular data source 118-124 or sources from which the requested data is available or received. For example, a search of the metadata 112 using the search string may identify data source 120 as the source from which the indicated data records may be obtained by the server 108. In response, the server 108 may generate a list of all data records that match the search string and the corresponding data source 118-124 from which such data records are available.

In operation 406, the server 108 may obtain, for a first matching record of data, the duplicated ACL from the metadata 112 from the list of records that are identified by the search string. As explained above, the duplicated ACL may be the functional equivalent of the ACL maintained by the data source 118-124 corresponding to the metadata record. The ACL may identify which entities have access to such data and one or more levels of permission the entity has for interacting with the data identified in the matching record. Thus, the server 108 may obtain the ACL record that corresponds to the data source from which the data is received and/or the data identified by the matching data record, and more particularly the server may obtain at least one ACL corresponding to at least one of the list of matching records obtained above from the search string. In operation 408, the server 108 then determines all of the users and/or group entries in the duplicated ACL that include the identifier provided by the requesting device in the search string to the server 108 or provided separate from the search string. As mentioned above, the server 108 and/or the duplicated ACL may include a mapping of requesting device identifiers to the EIMS identifiers in the ACL obtained from the data sources 118-124. The requesting device identifier may indicate an individual user of the data source 118-124 and/or groups to which the requesting device may belong and may be used to determine which entities are given access to which data records stored or managed by the server 108.

In operation 410, the server 108 determines if the ACL provides a level of access to the data record for the requesting device identifier or if no access is listed. As described above, the duplicated ACL may associate requesting device identifiers with access levels or permissions for accessing the data maintained by a data source 118-124. Thus, the server 108 may locate, within the duplicated ACL, the entries indicated by the requesting device identifier and the associated permission or access level of the entry. In some instances, the duplicated ACL may include multiple entries indicated by the requesting device identifier, such as if the requesting device identifier is associated with one or more groups. If the ACL does not provide access to the data records corresponding to the metadata record for the requesting device identifier, the server 108 may remove the matching data record from the list of matching records in operation 412. However, if the ACL indicates that the requesting device is provided access to the matching data record associated with the metadata record, the matching data record is included in the list of matching data records.

Regardless of whether the matching data record is included in the list of matching records, the server 108 may determine, in operation 416, if other matching data records are included in the list of matching records determined above. If yes, the server 108 may return to operation 406 to include or remove the additional matching data records from the list of matching records. In this manner, the server 108 may determine the access of the requesting device for each matching record in the list of matching data records obtained after applying the search string to the metadata 112. Once the access permission is determined for each matching record in the list of matching records, the server 108 may provide the search results to the requesting device 106 for display, such as on a display device of the requesting device. Through the method 400 of FIG. 4, the search results for data returned in response to the search string do not include matching data records for which the requesting device does not have permission to access based on the duplicated ACL of the corresponding metadata for the data source. In this manner, the displayed search results include only those data records to which the requesting device has permission to access as indicated by the data sources 118-124 and as applied through by the duplicated ACL of the corresponding metadata information 112.

In addition to providing a limited search results based on requesting device authentication, the server 108 may also determine a level of authorization for the request to view the system data 126. In particular, FIG. 5 is a flowchart of a method 500 for granting authorization to access one or more data sets from multiple data sources in accordance with one embodiment. Similar to above, the operations of the method 500 of FIG. 5 may be performed by the server 108 or other networking device.

Beginning in operation 502, the server 108 may receive a request to access or receive data from a requesting device 102-106. In particular, the requesting device 102-106 may transmit a request to access or view a data record from the list of available data records provided to the requesting device 102-106 from the server 108 based on the search string discussed above in relation to FIG. 4. In one instance, a user of the requesting device 102-106 may select, via a user input device associated with the requesting device 102-106, a displayed data record provided in response to entering the search string. In operation 504, the server 108 may obtain the duplicated ACL stored in the metadata 112 that is associated with the requested data record. For example, requesting device 106 may provide a request to view a data record available from the RDBMS 122. The server 108 may access a metadata record 112 associated with the requested data from the stored metadata 112 information. As described above, the stored metadata record may include a duplicated ACL that includes synchronized authorization and authentication information of the RDBMS 122 data source. This synchronized ACL may be retrieved by the server 108 from the database 116 of the server 108.

In operation 506, the server 108 may determine all of the synchronized users and/or groups in the retrieved ACL associated with the requesting device identifier. As described above, each requesting device 102-106 may be associated with a unique identifier that is used by the server 108 to identify requests and authorization to access data from the data sources 118-124. The requesting device 106 may therefore provide the unique requesting device identifier when transmitting the request to access the data record. The server 108 may compare the received requesting device identifier to one or more of the entries in the ACL of the corresponding metadata record 112 and determine the entries within the ACL to which the requesting device identifier matches, including as a user and/or group to which the identifier belongs. In operation 508, the server 108 may determine each permission or access-level of the entries in the ACL associated with the requesting device identifier. For example, the ACL may include multiple entries for the requesting device identifier for the individual identifier or as part of a group of identifiers and a corresponding level of access to the data record for each entry. The server 108 may thus determine the level of access or permissions granted for each entry. In some instances, the permission may provide for a limited access to the data record, full access to the data record, permission to alter the data, and the like.

In addition, the server 108 may determine the broadest level of access to the data record from the obtained permissions of the synchronized ACL. In particular, the server 108 may maintain a combination of logic configured to rank the various permissions contained in the ACLs of the server metadata 112 based on levels of access to the data records. For example, a permission that provides for access and modification of a data record to a user or requesting device may have a higher ranking than a permission that provides limited access to the data record. As a requesting device identifier may be associated with multiple permissions in an ACL, the server 108 may determine which permission provides the broadest access to the data record or the permission that has the highest ranking based on the maintained rankings of available permissions. In general, the server 108 may associate any rank to the permissions of the ACLs to accommodate the aims of the server 108 in providing access to the data records for the requesting devices 102-106.

In operation 510, the server 108 may determine if the broadest permission for the requesting device identifier allows access to the data record. If not, the server 108 may deny the requested access to the data record in operation 512. If access is granted based on the permissions in the ACL, the server 108 may request the data from the data source 118-124 in operation 514. In some instances, the server 108 may obtain the data record from the corresponding data source 118-124 and store the data 110 in a database 114 associated with the server 108. The requested data record may then be made available to the requesting device 106 for viewing or manipulation by the requesting device 106 or server 108.

Through the methods and systems described above, authentication and authorization access to multiple data sources via a data analytics system that maintains the access permissions of the individual data sources may be provided. The data analytics system may duplicate and/or read metadata from the multiple data sources, including access control lists (ACLs) including in the metadata and synchronize the received ACL to requesting device identifiers maintained by the data analytics system. By duplicating and processing authentication and authorization for the multiple data sources at the data analytics system, security of the data sources may be maintained without incurring a processing cost at the requesting devices of the data analytics system.

Figure 6:
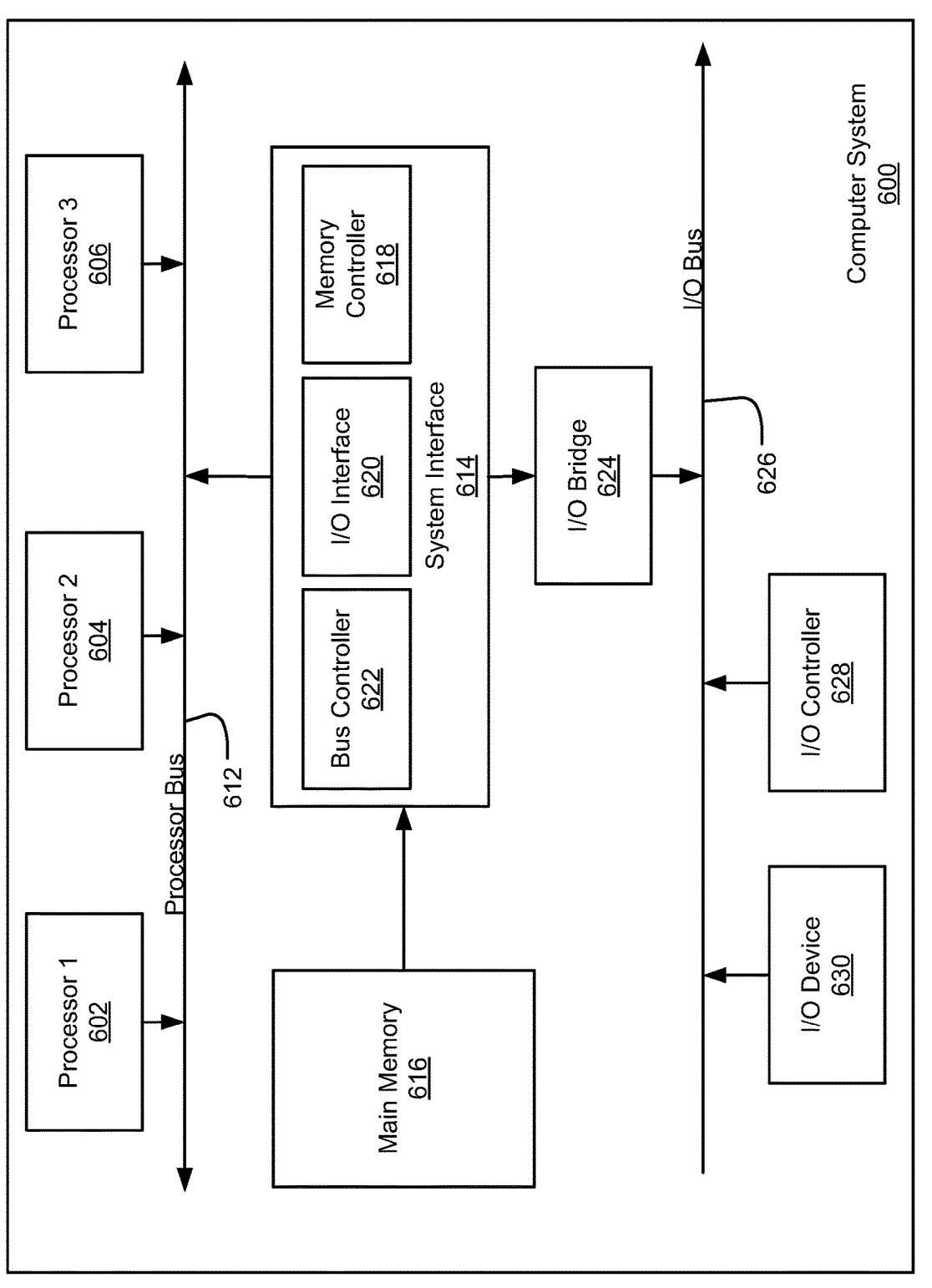
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the data analytics server 108 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Various modifications and additions can be made to the exemplary embodiments discussed without departing from the scope of the description. For example, while the embodiments described above refer to particular features, the scope of this invention also includes embodiments having different combinations of features and embodiments that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

What is claimed is:

1. A method for providing access to multiple sets of data, the method comprising:

aggregating, at a data analytics server, data from a plurality of data sources into an aggregated data set, wherein each of the data sources is associated with an access rule set comprising an entity identifier and a corresponding access permission to access a data record available from a corresponding data source of the plurality of data sources;

receiving, at the data analytics server and from a requesting device, a request to access the aggregated data set, the request comprising an identifier associated with the requesting device; wherein, the requesting device is denied access, based on the identifier associated with the requesting device, to at least one of the plurality of data sources providing data to the aggregated data set; and the requesting device is allowed access to the aggregated data set based on a transformed access control list generated by the data analytics server; and transmitting the aggregated data set to the requesting device when the requesting device is allowed access.

2. The method of claim 1, wherein aggregating the data from the plurality of data sources comprises:

utilizing a plurality of application programming interfaces (APIs) to convert requests for data to each of the plurality of data sources; and transmitting the converted requests to each of the plurality of data sources.

3. The method of claim 1 further comprising:

converting data received from the plurality of data sources into a common data format prior to aggregating the data into the aggregated data set.

4. The method of claim 1, wherein determining the requesting device is denied access to at least one of the plurality of data sources comprises:

obtaining a plurality of access rule sets from the plurality of data sources, each of the plurality of access rule sets comprising an entity identifier and a corresponding access permission to access a data record available from a corresponding data source of the plurality of data sources; and comparing the identifier associated with the requesting device to the obtained plurality of access rule sets.

5. The method of claim 4, wherein the plurality of access rule sets are embodied in metadata received from the plurality of data sources.

6. The method of claim 4 further comprising:

generating a mapping from the entity identifiers of the plurality of access rule sets to one or more entries in the transformed access control list.

7. The method of claim 4, wherein the transformed access control list comprises a plurality of synchronized identifiers each corresponding to an entity identifier of the plurality of access rule sets and a plurality of synchronized permission rules corresponding to access permissions of the plurality of access rule sets.

8. The method of claim 1, wherein aggregating data from the plurality of data sources comprises registering a user-name and password with the data sources to authenticate the data analytics server with the plurality of data sources, the username and password unique to the data analytics server.

9. The method of claim 4 further comprising:

generating an aggregate access rule set for the data analytics server by combining a plurality of permission rules of the transformed access control list based on the identifier associated with the requesting device.

10. The method of claim 9, wherein the combined plurality of permission rules is based on a ranking of permissions of the plurality of permission rules.

11. A data management device comprising:

a processor in communication with a non-transitory, tangible storage medium storing instructions that are executed by the processor to perform operations comprising:

aggregating data from a plurality of data sources into an aggregated data set, wherein each of the data sources is associated with an access rule set comprising an entity identifier and a corresponding access permission to access a data record available from a corresponding data source of the plurality of data sources;

receiving, from a requesting device, a request to access the aggregated data set, the request comprising an identifier associated with the requesting device;

determining, based on the identifier associated with the requesting device, the requesting device is denied access to at least one of the plurality of data sources providing data to the aggregated data set;

determining, based on a transformed access control list, the requesting device is allowed access to the aggregated data set; and providing the aggregated data set to the requesting device.

12. The data management device of claim 11, wherein the instructions further cause the processor to perform the operation of:

utilizing a plurality of application programming interfaces (APIs) to convert requests for data to each of the plurality of data sources; and transmitting the converted requests to each of the plurality of data sources.

13. The data management device of claim 11, wherein the instructions further cause the processor to perform the operation of:

converting data received from the plurality of data sources into a common data format prior to aggregating the data into the aggregated data set.

14. The data management device of claim 11, wherein determining the requesting device is denied access to at least one of the plurality of data sources comprises:

obtaining a plurality of access rule sets from the plurality of data sources, each of the plurality of access rule sets comprising an entity identifier and a corresponding access permission to access a data record available from a corresponding data source of the plurality of data sources; and comparing the identifier associated with the requesting device to the obtained plurality of access rule sets.

15. The data management device of claim 14, wherein the plurality of access rule sets are embodied in metadata received from the plurality of data sources.

16. The data management device of claim 14, wherein the instructions further cause the processor to perform the operation of:

generating a mapping from the entity identifiers of the plurality of access rule sets to one or more entries in the transformed access control list.

17. The data management device of claim 14, wherein the transformed access control list comprises a plurality of synchronized identifiers each corresponding to an entity identifier of the plurality of access rule sets and a plurality of synchronized permission rules corresponding to access permissions of the plurality of access rule sets.

18. The data management device of claim 11, wherein aggregating data from the plurality of data sources comprises registering a username and password with the data sources to authenticate the data management device with the plurality of data sources, the username and password unique to the data management device.

19. The data management device of claim 14, wherein the instructions further cause the processor to perform the operation of:

generating an aggregate access rule set for the data management device by combining a plurality of permission rules of the transformed access control list based on the identifier associated with the requesting device.

20. A system for managing a plurality of data sources, the system comprising:

at least one processor; and memory storing computer-readable instructions that, when executed by the at least one processor, cause the at least one processor to:

receive, from a requesting device, a request to access an aggregated data set comprising data from at least two of the plurality of data sources, the request comprising an identifier associated with the requesting device; and transmit the aggregated data set to the requesting device when an access rule set associated with one of the at least two of the plurality of data sources comprises a rule denying access to the requesting device to the one of the at least two of the plurality of data sources.

* * * * *